(12) United States Patent
Russell et al.

(10) Patent No.: US 6,312,784 B2
(45) Date of Patent: *Nov. 6, 2001

(54) THERMALLY INSULATING TEXTILE

(75) Inventors: Derrick Arthur Russell; Stuart Frederick Elton; David Congalton, all of Colchester (GB)

(73) Assignee: The Secretary of State for Defence in her Britannic Majesty's Government of the United Kingdom of Great Britain and Northern Ireland, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,074

(22) PCT Filed: Apr. 7, 1997

(86) PCT No.: PCT/GB97/00966

§ 371 Date: Oct. 30, 1998

§ 102(e) Date: Oct. 30, 1998

(87) PCT Pub. No.: WO97/42026

PCT Pub. Date: Nov. 13, 1997

(30) Foreign Application Priority Data

May 2, 1996 (GB) .................................. 9609253

(51) Int. Cl.$^7$ ................ B32B 3/06; B32B 3/04; B32B 1/00

(52) U.S. Cl. ............... 428/101; 428/175; 428/176; 428/181; 428/182; 442/6; 442/10

(58) Field of Search ................ 428/101, 119, 428/120, 176, 181, 182, 175; 442/6, 10

(56) References Cited

U.S. PATENT DOCUMENTS 5,918,480 * 7/1999 Nagata et al. ..................... 62/440

FOREIGN PATENT DOCUMENTS

| 0 290 328 | 11/1988 | (EP) . |
| 59 088 916 A | 5/1984 | (JP) . |
| 63 170 425 a | 7/1988 | (JP) . |
| 02 289 344 A | 11/1990 | (JP) . |
| 03 130 147 A | 6/1991 | (JP) . |
| 05 051 853 A | 3/1993 | (JP) . |
| 06 240 535 A | 8/1994 | (JP) . |

* cited by examiner

Primary Examiner—Elizabeth M. Cole
Assistant Examiner—Ula C. Ruddock
(74) Attorney, Agent, or Firm—Nixon & Vanderhye

(57) ABSTRACT

A thermally insulating textile (2) adapted to provide a variable degree of thermal insulation dependent on ambient temperature, the textile including a laminate of two fabric layers (15, 15') having interposed a bulking layer (1), which may be one or more fabric layers (3a, 3b) on to which is deposited a shape memory polymer (4) in a repeat pattern. The bulking layer (1) is adapted to cooperate with the fabric layers (15, 15') to vary the gap therebetween upon departure in a desired direction of the textile temperature from a predetermined temperature.

13 Claims, 3 Drawing Sheets

THERMALLY INSULATING TEXTILE

This is a 35 U.S.C. §371 of PCT/GB97/00966, filed Apr. 7, 1997.

The present invention relates to a thermally insulating textile and more particularly to a thermally insulating textile in which the degree of insulation automatically varies in response to changes in ambient temperature.

BACKGROUND OF THE INVENTION

The thermal protection offered by currently available protective garments which employ thermally insulating textiles to trap layers of air may be altered by varying the amount of trapped air. This may be achieved by having the wearer add or remove garment layers. However this requires the wearer either to carry a number of garments or to wear a garment adapted to protect against the largest likely change in ambient temperature. As thermally protective garments tend to be bulky both solutions are likely to prove cumbersome to the wearer. Additionally, the wearing of a garment which provides protection against the largest potential change in ambient temperature, for example in situations where there may be a likelihood of fire or a risk of exposure to cold, may place thermal stress on the wearer in the absence of these situations.

As an alternative to increasing the number of garment layers in order to achieve an increased thermal protection the air gap between two layers of a garment may be increased. Thus, by providing a garment in which the air gap may be varied variable thermal protection may be achieved. One known fabric which may be utilised to provide such a variable air gap garment is described in GB 2 234 705 A and comprises a material having two parallel material layers between which is disposed fibres, the height of which may be manually varied by the effecting a relative movement of the layers. This solution requires the wearer to pull on one or other of the layers by, for example, zipping and unzipping gussets in order to vary the thermal insulation and has the disadvantages that the wearer must stop what he or she is doing in order to adjust the garment and in that the wearer may not respond quickly enough to rapid environmental changes to provide timely thermal protection.

Figure 1A:
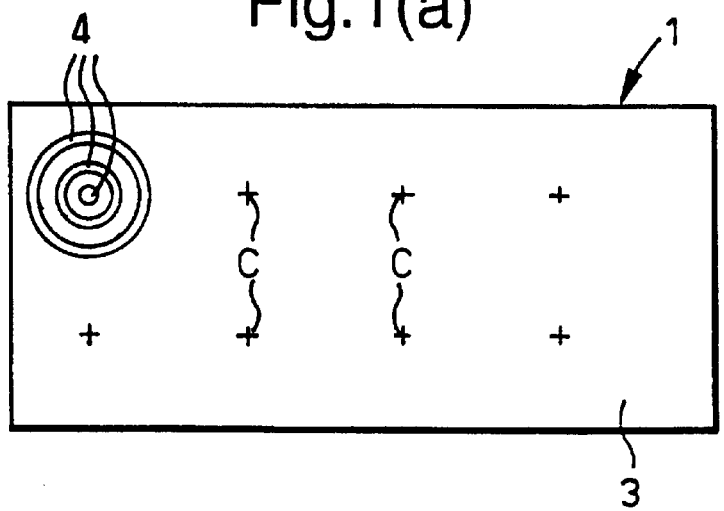
FIG. 1(a) is a plan view of a schematic representation of a textile according to the invention showing a volume change in the shaped memory polymer.

According to the present invention there is provided a textile comprising a laminate of two material layers having interposed a temperature sensitive bulking layer, the bulking layer comprising a shape memory composition being adapted to co-operate with the material layers to automatically vary the gap therebetween upon departure in a desired direction of the textile temperature from a predetermined temperature.

Thus, as the volume of the textile automatically changes then the thermal insulating properties of the textile changes, increasing as the volume increases to trap more air and decreasing as the volume decreases to trap less air. This has the advantage that garments fabricated using this textile are able to provide a variable thermal protection for the wearer without the need for the wearer to vary the number of garments worn or to manually make changes to the air gap.

So called "shape memory" compositions are well known (for example: pgs 29–31 Plastics Engineering February 1995; "Properties and Applications of Polyurethane-Series Shape Memory Polymer" pgs 1998–2001 ANTEC '94 and "The Properties and Processing of Shape Memory Alloys . . . " AD-Vol 24/AMD Vol 123, Smart Structures and Materials Avionics Society of Mechanical Engineering (ASME) 1991) and have the property that they can exist in two solid phases so that at certain temperatures they will exist primarily in one phase or the other. These compositions may be incorporated into a textile for example by depositing a coating onto a flexible substrate such as fabric layer, which may be the internal face of the fabric envelope, or by incorporating fibres made from such compositions into the weave of a fabric layer and may be employed in either a reversible or irreversible process.

The reversible process exploits mainly the property of these compositions that there is associated a specific volume change with the change between phases while the irreversible process exploits mainly the "shape memory" property of these compositions where a shape incorporated in one phase at a particular temperature is altered to another shape in the second phase at a predetermined temperature only to be recovered when the composition reverts to the original, particular temperature. Thus, by choosing the volume of the shape to be much greater at the particular temperature than at the predetermined temperature a textile incorporating such a composition is capable of undergoing an irreversible increase in volume with departure from the predetermined temperature to the particular temperature.

When used reversibly, for example when deposited onto a flexible substrate, such as a fabric, plastics or rubber layer, so as to provide out of plane protuberances in that substrate as the specific volume of the composition decreases, the change in specific volume of the shape memory composition may be no more than a few percent. Preferably the composition and substrate arrangement of the textile is therefore made so as to magnify this change. This may be achieved by choosing a pattern made by the deposited shape memory composition onto the substrate so as to provide a multiple effect, such as by employing a plurality of concentric rings in a repeat pattern.

Usefully a further enhancement of this multiple effect may be achieved by providing a textile having one or more pairs of such patterned flexible substrates arranged such that the protuberances of each substrate of the pair will oppose one another. As an alternative to the use of such patterns, there may be provided a folded substrate which may be, for example, folded in concertina or spiral fashion, the substrate having deposited on portions thereof the shape memory composition, with the portions being selected to provide for unfolding of the folded substrate as the specific volume of the shape memory composition decreases. As the substrate unfolds then the size of the cross-section of the textile will increase to produce an increase in its thermal insulation effect.

It will be obvious to those skilled in the art that through a suitable choice of the portions on which to deposit the composition a folding of the substrate may be effected by an increase in the volume of the composition. Reversible arrangements such as are discussed in this paragraph have the advantage that as the temperature changes from a predetermined temperature, typically between about 20° C. and 40° C., in a desired direction bulking of the shape memory composite may occur by an amount dependent on that temperature change to provide the textile with a variable thermal insulation which reverses as the textile temperature moves back towards the predetermined temperature.

The textile may alternatively be made to undergo an irreversible change in thermal insulation and may employ substrates substantially similar to the ones employed for the textile which acts reversibly, that is deposited, patterned, inter-woven or folded flexible substrates. These substrates are made to provide an increase in the thermal insulation of the textile by being shaped into a high volume structure at a temperature where the change in thermal insulation is required, for example at about 60° C. for high temperature protection, or at a higher processing temperature, then after cooling as appropriate, stress applied to reduce the bulk, for example by compressing or folding the original structure and the stress frozen in at a predetermined temperature, typically between about 20° C. and 40° C. Such textiles have the advantage over textiles constructed to undergo reversible thermal insulation changes that large retained strains can be released. This provides for a more pronounced volume change within the textile and hence a greater change in the thermal protection provided by such a textile. This is particularly suitable for use in the production of thermal protection garments since such garments need to be able to automatically react to large and rapid temperature changes.

Embodiments of the invention will now be described, by way of examples only, with reference to the drawings in the accompanying figures of which:

FIG. 1 are schematic representations of a textile according to the present invention having a bulking layer comprising a shape memory composition deposited on a fabric substrate with a) a plan view of the fabric substrate b) a sectional view through the textile at 20° C. and c) a sectional view through the textile at 0° C.

FIG. 2 are schematic representations of a textile according to the first aspect of the present invention capable of an irreversible change with a) the textile at 20° C. and b) the textile at 70° C.

Figure 3A:
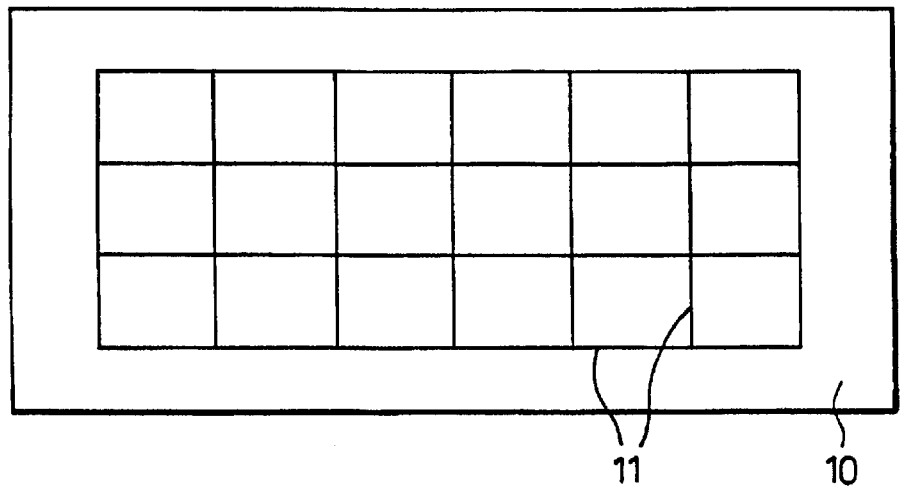
FIG. 3(a) is a plan view of a textile of the invention in which the bulking layer is formed by shape memory alloy wires in a grid pattern attached to the fabric substrate.

FIG. 3 are schematic representations of a textile according to the present invention having a building layer comprising a shape memory alloy incorporated into the weave of a fabric substrate with a) a plan view of the fabric substrate b) a sectional view through the textile at 20° C. and c) a sectional view through the textile at 70° C.

Figure 1B:
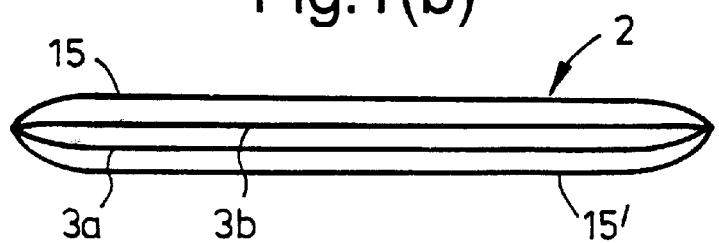
FIG. 1(b) is a sectional view through the textile at 20° C.
Figure 1C:
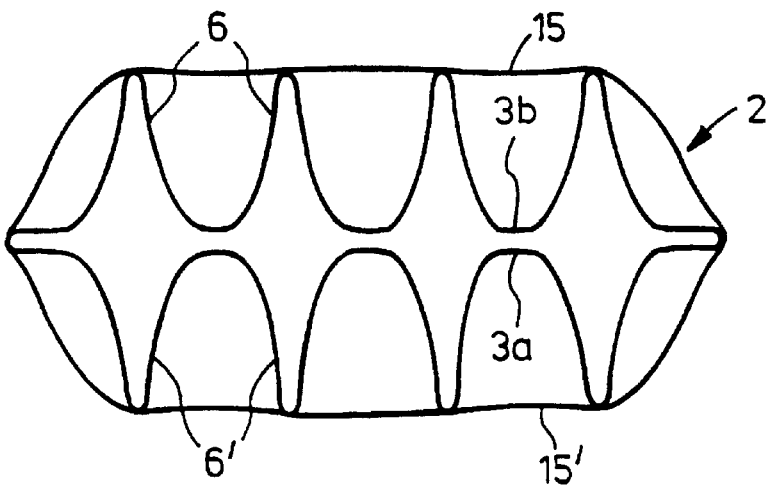
FIG. 1(c) is a sectional view through the textile at 70° C.

Referring to FIG. 1, the bulking layer 1 of the textile 2 comprises a pair of fabric substrates 3a,b onto which is deposited a polyurethane based shape memory polymer in a repeat pattern. The polymer being chosen to exhibit a reversible phase change to a phase having a decreased specific volume at about 0° C., it being obvious to those skilled in the art that a number of suitable polymers exist which may be substituted for the one here. One such fabric substrate 3 is shown in FIG. 1a and is provided with a printed pattern of concentric rings 4 of polymer, repeated at centres C. These rings 4 are printed at about 20° C. and are made planar at that temperature by suitable equilibration, for example pressing through release paper at an iron temperature of approximately 110° C. The textile 2 shown in FIGS. 1b and 1c comprise two fabric layers 15,15' having a pair of fabric substrates 3a,b sandwiched between them The substrates 3a,b are correlated such that the protuberances 6,6', which appear in each substrate as the phase changes, oppose one another. This correlation may be maintained by stitching the layers 3a,b, 15,15' of the textile 2 together at their edges.

Since the textile according to FIG. 1 exploits the volume change in the shape memory polymer to achieve a change in the thermal insulation properties of that textile then the changes are reversible.

A variant on the textile of FIG. 1 would be to choose the polyurethane shape memory polymer to exhibit a phase change at higher temperatures, for example at about 70° C., to provide a textile capable of high temperature thermal protection.

Figure 2A:
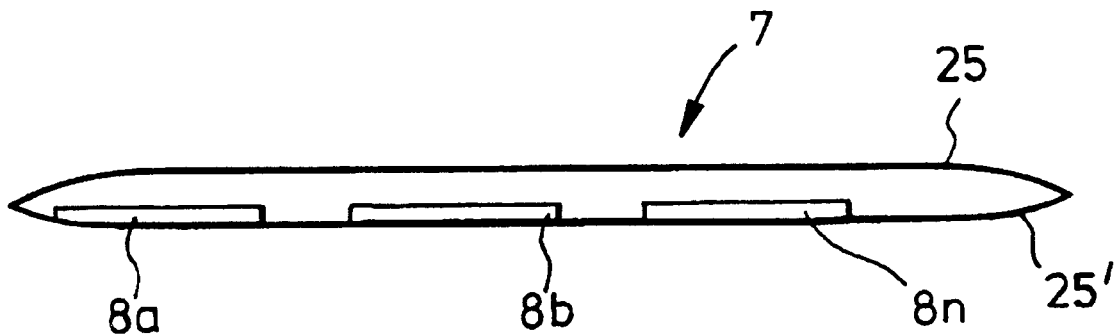
FIG. 2(a) is a schematic representation of a textile according to the invention capable of irreversible change at 20° C.

A textile 7 which is formed so as to undergo an irreversible increase in thermal insulation is shown in FIG. 2. The bulking layer comprises a number of fabric strips 8a . . . n on to which is deposited a polyurethane shape memory polymer. These strips 8a . . . n are made to form individual coils or "springs" which are made and equilibrated in an extended state at 70° C. These stress free structures 8a . . . n are then coiled to exhibit the compact cross-sections, as shown in FIG. 2a, and the applied stress frozen in at 20° C. One end of each such compact coil 8a . . . n is then looped through the weave of one of the fabric layers 25, 25' and fixed by ultrasonic point welding. These coils 8a . . . n form the bulking layer over substantially all of one face of one of the fabric layers 25,25'.

Figure 2B:
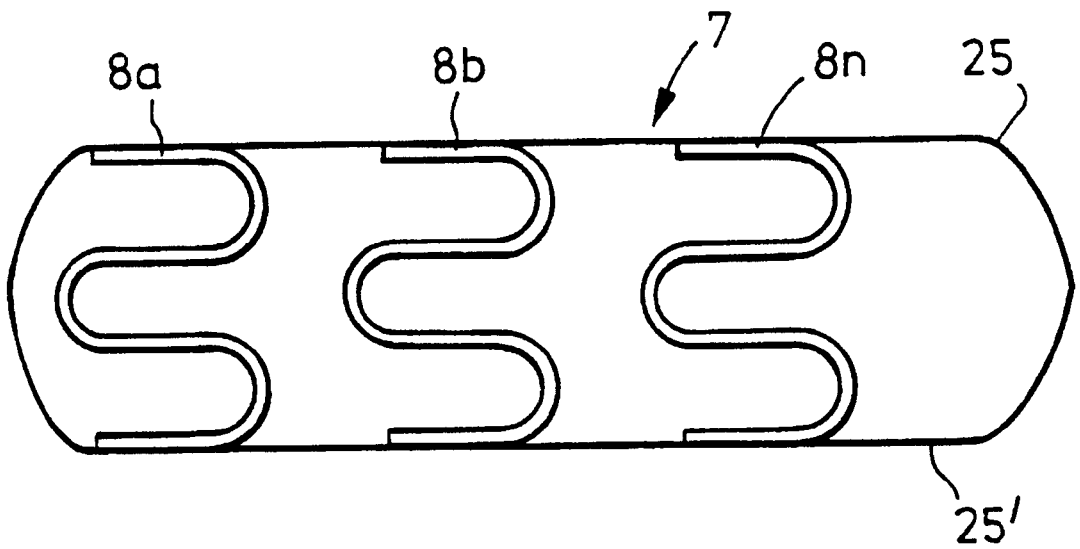
FIG. 2(b) is a schematic representation of a textile according to the invention capable of irreversible change at 70° C.

On exposure of the textile 7 to a temperature of 70° C. the bulking layer responds irreversibly with the coils 8a . . . n recovering their initial extended state to push apart the layers of fabric 25,25' as shown in FIG. 2b.

It will be appreciated that a similar effect may be obtained by replacing the coated fabric strips with coiled "springs" of a suitable shape memory metals, such as Nickel/Titanium alloys.

Figure 3B:
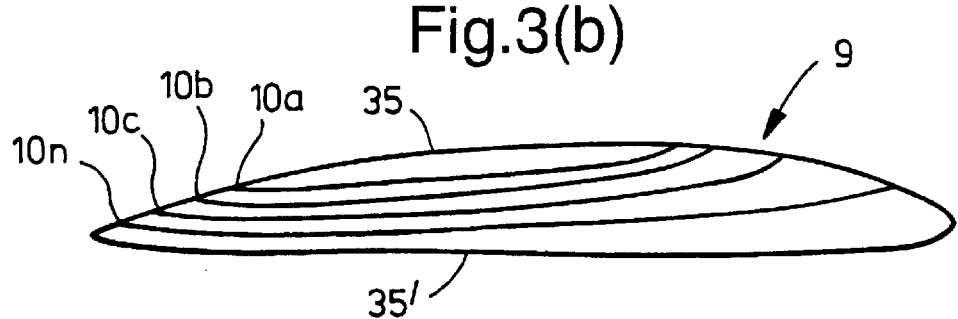
FIG. 3(b) is a sectional view through the fabric which is substantially flat at 20° C.
Figure 3C:
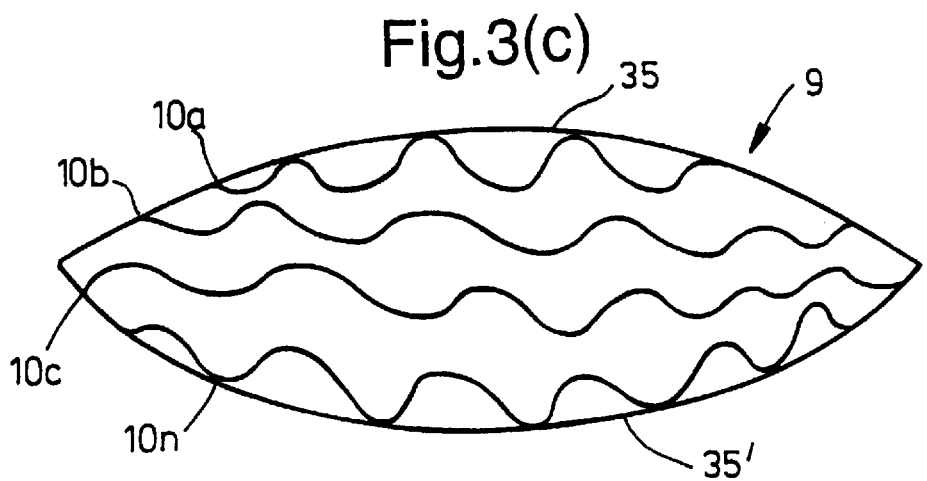
FIG. 3(c) is a schematic view of the textile showing that as the temperature raises to a higher temperature the bulking layer puckers.

A further embodiment of a textile 9 according to the present invention is shown in FIG. 3. The bulking layer comprises a fabric substrate 10 onto which are attached, in a grid pattern, Nickel/Titanium shape memory alloy wires 11 having a 4% retained strain. The wires are fixed on the fabric substrate 10 by having an adhesive applied at their crossing points. A number of these substrates 10a . . . n, chosen so as to be able to effect the desired change in thermal insulation, are sandwiched between two fabric layers 35,35' to form the bulking layer of the textile 9 which is substantially flat at 20° C. (FIG. 3b). As the temperature of the textile varies from the predetermined temperature towards a higher temperature the substrates 10a . . . n of this bulking layer pucker to increase the gap between the layers 35,35' as shown schematically in FIG. 3c.

It will be clear to a person skilled in the art that while the above examples utilise fabric substrates and layers any suitably flexible material may be substituted, depending on the desired characteristics of the garments to be fabricated from the textile.

What is claimed is:

1. A thermally insulating textile with variable thermal insulation characteristics in which the degree of thermal insulation automatically varies in response to changes in ambient temperature, said textile comprising a laminate of two material layers having interposed a temperature sensitive bulking layer defining a gap between the material layers, wherein the bulking layer comprises a shaped memory composition the shaped memory composition changing its volume or shape or both in response to a change in its temperature and the volume or shape change automatically varying the gap between the two material layers and hence varying the thermal insulating characteristics of the textile.

2. A textile as claimed in claim 1 wherein the bulking layer additionally comprises a flexible substrate onto which the shape memory composition is contacted.

3. A textile as claimed in claim 2 wherein the flexible substrate is in a folded state at the predetermined temperature with the shape memory composition contacted thereto so as to be capable of effecting unfolding of the substrate upon departure from the predetermined temperature.

4. A textile as claimed in claim 2 wherein the shape memory composition is formed as a deposit on to the flexible substrate in such a manner as to provide out of plane protuberances when the specific volume of the composition decreases.

5. A textile as claimed in claim 4 wherein the shape memory composition is deposited onto the flexible substrate to define a plurality of concentrically arranged rings in a repeat pattern.

6. A textile as claimed in claim 4 wherein there is additionally provided one or more substantially similar composition deposited flexible substrates, the substrates being arranged in pairs such that the protuberances in one substrate of a pair will oppose those in the other substrate of that pair.

7. A textile as claimed in claim 2 wherein either or both the flexible substrate and material layers comprises a fabric.

8. A textile as claimed in claim 2 wherein the bulking layer comprises one or more flexible substrates having fibres of shape memory composition contacted thereto.

9. A textile as claimed in claim 8 wherein the fibres are incorporated into a weave of one or more fabric substrates.

10. A textile as claimed in claim 9 wherein the shape memory composition is in the form of shape memory alloy wires.

11. A textile as claimed in claim 10 wherein the wires comprise alloys of Nickel and Titanium.

12. A textile as claimed in claim 8 wherein the fibres comprise shape memory alloy wires are formed into a grid contacted to a surface of the one or more flexible substrates.

13. A textile as claimed in claim 1 wherein the bulking layer comprises a plurality of shape memory alloy wires each adapted to move from a coiled configuration to an un-coiled configuration on departure from the predetermined temperature.

* * * * *